(12) United States Patent
Tracy et al.

(10) Patent No.: US 8,583,946 B2
(45) Date of Patent: Nov. 12, 2013

(54) EXTERNAL DEVICE CHARGING WHILE NOTEBOOK IS OFF

(75) Inventors: Mark S. Tracy, Tomball, TX (US); Paul J. Doczy, Cypress, TX (US); Jeffrey A. Lev, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 12/866,613

(22) PCT Filed: Feb. 22, 2008

(86) PCT No.: PCT/US2008/054776
§ 371 (c)(1),
(2), (4) Date: Nov. 8, 2010

(87) PCT Pub. No.: WO2009/105113
PCT Pub. Date: Aug. 27, 2009

(65) Prior Publication Data
US 2011/0047393 A1  Feb. 24, 2011

(51) Int. Cl.
*G06F 1/26* (2006.01)
*H02J 7/00* (2006.01)

(52) U.S. Cl.
USPC .......................... 713/300; 713/340; 320/137

(58) Field of Classification Search
None
See application file for complete search history.

(56) References Cited

U.S. PATENT DOCUMENTS

| 4,658,154 | A | * | 4/1987 | Harnden et al. | 307/132 R |
| 5,148,002 | A | * | 9/1992 | Kuo et al. | 219/211 |
| 6,237,100 | B1 | * | 5/2001 | Cromer et al. | 713/300 |
| 6,504,343 | B1 | | 1/2003 | Chang | |
| 6,625,738 | B1 | * | 9/2003 | Shiga | 713/310 |
| 2003/0117104 | A1 | | 6/2003 | Liao | |
| 2006/0035527 | A1 | * | 2/2006 | Numano | 439/668 |

FOREIGN PATENT DOCUMENTS

| KR | 10-2004-0053699 | 6/2004 |
| KR | 10-2004-0099490 | 12/2004 |
| KR | 10-2006-0033330 | 4/2006 |

OTHER PUBLICATIONS

International Searching Authority, International Search Report and Written Opinion dated Oct. 30, 2008, pp. 10.

* cited by examiner

*Primary Examiner* — Dennis M Butler

(57) ABSTRACT

A computer comprises a power supply that provides operating power for the computer and a connector on the computer through which an external device can be coupled to the computer. The power supply powers an auxiliary power rail even when the computer is otherwise off. The auxiliary power rail is provided to the connector to thereby provide power to the external device even when the computer is off.

10 Claims, 1 Drawing Sheet

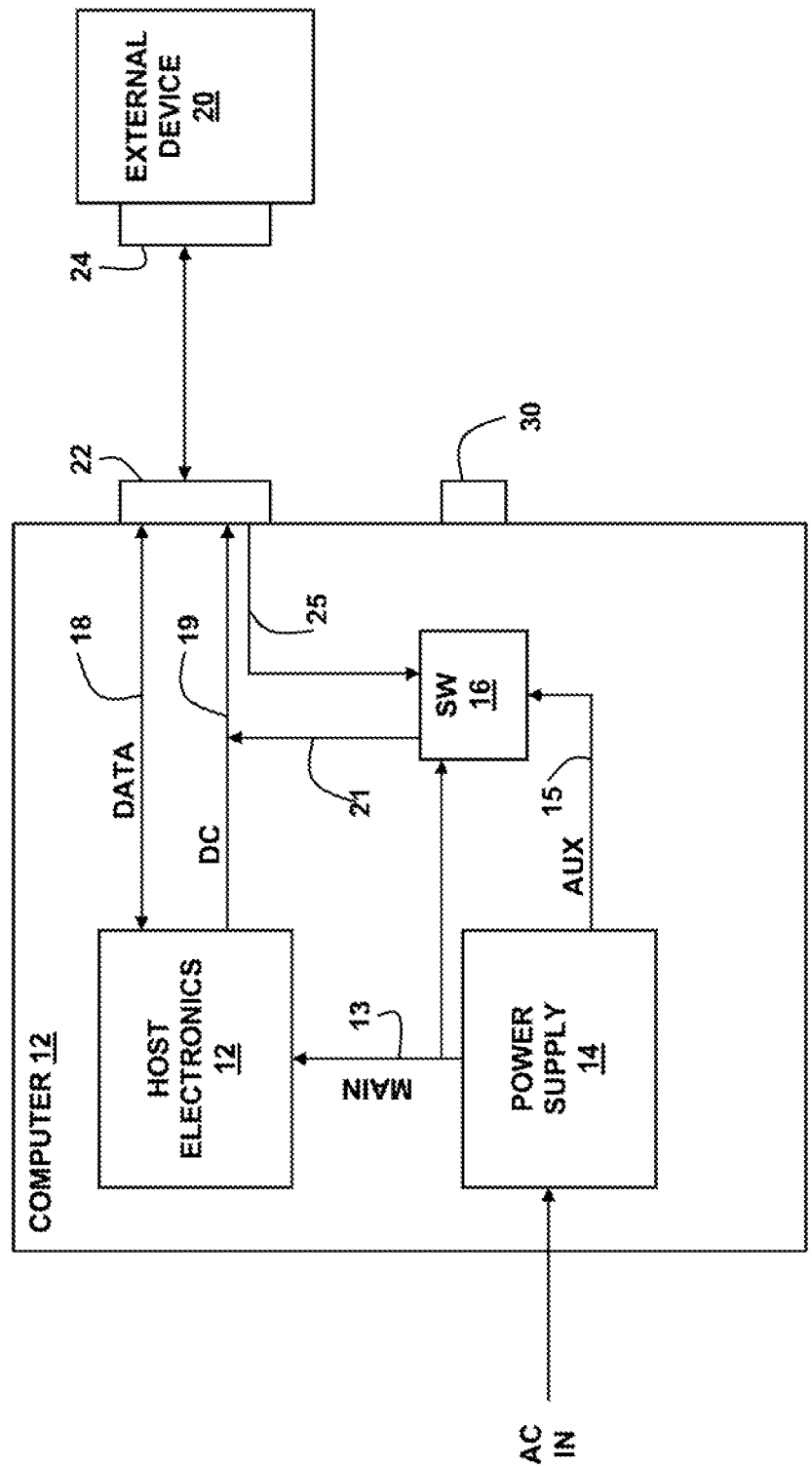

EXTERNAL DEVICE CHARGING WHILE NOTEBOOK IS OFF

BACKGROUND

A traveler usually does not like to carry multiple power adapters for the various electronic devices (e.g., cell phones, personal digital assistants (PDAs, media players) that the user may carry, in addition, depending on the length of the trip, the batteries of many such portable devices do not last for the entire trip. Many such devices have rechargeable batteries. At least some such devices can be charged from an external port, such as a universal serial bus (USB), of a computer when the computer is powered on and operational. Turning the computer on merely to charge an external device is time consuming and cumbersome.

BRIEF DESCRIPTION OF THE DRAWINGS

For a detailed description of exemplary embodiments of the invention, reference will now be made to the accompanying drawings in which:

FIG. 1 shows a system in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first member couples to a second member, the first member may directly contact the second member or connect to the second member through an intermediary structure.

DETAILED DESCRIPTION

FIG. 1 shows a system 10 comprising a computer 9 to which an external device 20 can be removably coupled. The device 20 is referred to as "external" because it is external to, and separate from, computer 9. The external device 20 performs any one or more of a variety of functions, in some embodiments, the external device is a media player (e.g., MP3 player) and may be portable. The external device is a battery-operated device and thus has rechargeable batteries that can be recharged by, for example, the computer 9.

The external device 20 comprises a connector 24 that mates with a corresponding externally-accessible connector 22 of the computer 9 to thereby permit the device 20 to be connected to the computer 9. In some embodiments, the connector 24 of the device 20 connects directly to the computer's connector 22 (as shown in FIG. 1). In other embodiments, an electrical cable (not shown) connects the external device 20 to the computer's connector 22, in at least some embodiments, the external device 20 comports with the universal serial bus (USB) protocol and, as such, couples to a USB port (connector 22) on the computer 9. The communication protocol, however, can be other than the USB protocol as desired.

When coupled to the computer 9, the external device 20 receives data from and/or transmits data to host electronics 12 depending on the function performed by the external device. The data is provided on signal lines 18. The host electronics 12 also provide power to the external device via lines 19. In some embodiments, the power comprises a direct current (DC) voltage. The DC voltage provided by the host electronics 12 can be used by the external device 20 to operate its own electronics and/or charge its internal rechargeable battery.

The host electronics 12 in the computer 9 comprises any of a variety of components of a computer. Exemplary components include a processor and memory. The host electronics 12 also comprise an electrical interface compatible with the external device 20. In the case in which the external device 20 is a USB device, the host electronics 12 comprises a USB controller.

As shown, the computer 9 also comprises a power supply 14. The power supply 14 converts alternating current (AC) voltage (e.g., 120 VAC) to one or more suitable DC voltages to operate the host electronics 12, and through the host electronics, to power the external device 20 via a DC voltage on lines 19. Accordingly, the power supply 14 provides a MAIN power rail 13 to the host electronics 12. The MAIN power rail 13 is active ("hot") whenever the computer 9 is on and operational. When the computer 9 is shut down, the power supply turns of the MAIN power rail 13 to thereby shut off host electronics 12.

The power supply 14 also provides an auxiliary (AUX) power rail 15. In various embodiments, the AUX power rail 15 is always active (on) as long the computer 9 is plugged in to an active source of AC power. In some embodiments, the computer 9 includes a switch 16 as shown. The switch 18, which comprises a solid-state switch such as a field effect transistor (FET), selectively couples the AUX power rail 15 to the DC line 19 (via line 21), and thus to the connector 22 to power the external device 20 and/or charge a battery in the external device. Because the auxiliary power rail (which is always on) is used, the external device 20 can be powered and/or have its battery recharged even if the computer is off. Accordingly, a user need only connect the external device 20 to the computer's connector 22 to operate the device or charge its battery, and need not power on or boot up the computer 9.

In some embodiments, the switch 18 is manually activated by a user (via an external button, not shown) to connect the AUX power rail 15 to the DC line 19 and thus to the connector 22. In other embodiments, a mechanical "quick switch" is provided in connector 22 that is activated upon a user coupling the external device 20 to connector 22. The quick switch asserts a signal line 25 to the switch 18 which responds by coupling the AUX power rail to DC line 19. When the external device 20 is not coupled to the connector 22 of the computer, the signal line 25 is not asserted and the AUX power rail is not coupled to the DC line 19. Further still, the solid-state switch 16 receives the MAIN power rail 13 which is used by the switch to determine if the computer is on or off. In such embodiments, the switch selectively couples the auxiliary power rail 15 to the external device 20 via the connector 22 when the computer is off (as determined via the MAIN power rail) and the external device 20 is coupled to the connector 22 (as determined by signal 25.

In some embodiments, the switch 16 is not provided and the auxiliary power rail 15 connects directly to the DC line 19 provided to connector 22 thereby ensuring that a source of power is always available at connector 22 regardless of whether the computer is on or off.

If desired, a visual indicator 30 can be provided on the computer 9. The visual indicator 30 may comprise a light emitting diode (LED) or other type of indicator. The visual indicator 30 provides a positive indication to a user that power is being provided, when the computer 9 is off, to the connector 22 (via the AUX power rail 15) and thus to the external device 20. If such power is being used to charge the device's battery, the visual indicator indicates that the device 20 is being recharged. In some embodiments, the visual indicator 30 illuminates when power the auxiliary power rail is provided to the connector 22 and the computer is otherwise off (as explained above).

The above discussion is meant to be illustrative of the principles and various embodiments of the present invention. Numerous variations and modifications will become apparent to those skilled in the art once the above disclosure is fully appreciated. St is intended that the following claims be interpreted to embrace all such variations and modifications.

What is claimed is:

1. A computer, comprising:
    a power supply that provides operating power for the computer as well as an auxiliary power rail;
    a connector on the computer through which an external device can be coupled to said computer; and
    a switch to selectively couple the auxiliary power rail to the connector;
    wherein said power supply powers the auxiliary power rail even when the computer is otherwise off; and
    wherein, with the computer in an off state, the computer is to detect when an external device is connected to the connector and, in response, the switch is provide said auxiliary power rail to said connector to thereby provide power to the external device even when said computer is in the off state.

2. The computer of claim 1 wherein said connector is a universal serial bus (USB) connector.

3. The computer of claim 1 further comprising a visual indicator that visually indicates when said connector receives voltage from said auxiliary power rail.

4. The computer of claim 1 further comprising a visual indicator that visually indicates when said connector receives voltage from said auxiliary power rail when said computer is off.

5. The computer of claim 1 wherein said computer, via said connector, charges a battery in the external device even when the computer is off.

6. A computer, comprising:
    means for electrically coupling to an external device; and
    means for detecting that the external device has been connected to the computer when said computer is in an off state and charging a battery in the external device when said computer is in the off state.

7. The computer of claim 6 wherein said means for charging the battery comprises an auxiliary power rail from a power supply, said auxiliary power rail being active even when said computer is off.

8. The computer of claim 6 further comprising means for visually indicating to a user that the battery is being charged when said computer is off.

9. A computer, comprising:
    a power supply that provides operating power for the computer as well as an auxiliary power rail, said auxiliary power rail remaining active even when said computer is otherwise in an off state;
    a connector on the computer through which an external device can be coupled to said computer; and
    a solid-state switch that detects the external device when the computer is in the off state and selectively couples the auxiliary power rail to the external device via the connector when the computer is in the off state and the external device is coupled to the connector.

10. The computer of claim 9 further comprising a visual indicator coupled to said solid-state switch, said visual indicator indicates when the auxiliary power rail is provided to the connector.

\* \* \* \* \*